May 10, 1932. H. GROB 1,857,149
DEVICE FOR TESTING ELECTRIC VOLTAGE REGULATORS
Filed April 27, 1927
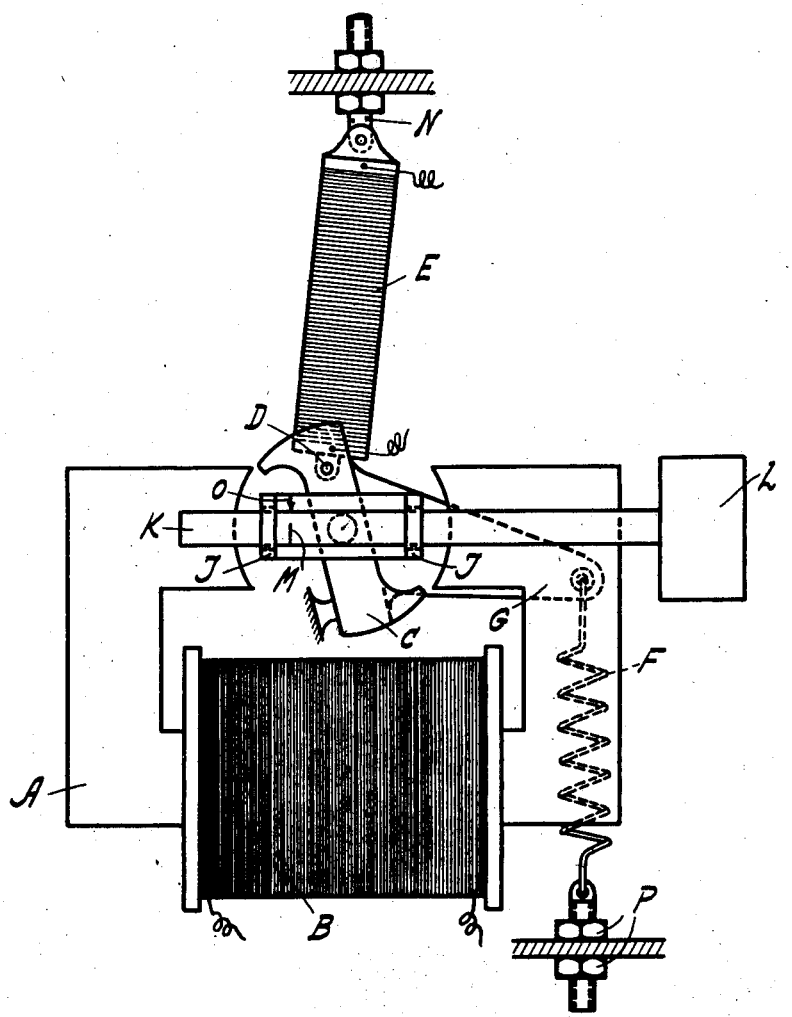
Inventor:
Hugo Grob
Robert S. Blair
Attorney.

Patented May 10, 1932

1,857,149

UNITED STATES PATENT OFFICE

HUGO GROB, OF BERLIN, GERMANY

DEVICE FOR TESTING ELECTRIC VOLTAGE REGULATORS

Application filed April 27, 1927, Serial No. 187,100, and in Germany July 8, 1926.

This invention relates to apparatus or devices for testing and aiding in adjusting electrical regulating apparatus such as electric voltage regulators.

The usual electric regulating apparatus comprises in substance an electromagnet the coil of which is excited by the function of output of the source of current which is to be regulated, a spring acting in opposition to the force of the magnet, and a mechanical device which moves in response to any differences between these two forces and which, by its movements, causes more or less resistance to be placed in the electrical circuit. In case of voltage regulators, for example, the coil of the electromagnet is excited by the voltage to be regulated. The function of such an apparatus is to maintain the voltage in the circuit substantially constant. If the voltage is to be maintained constant throughout the entire scope of action of the regulating apparatus, it is desirable that all forces within the apparatus be in equilibrium throughout the whole extent of movement of the apparatus when the voltage being regulated is at the correct value.

As is well known, the force exerted by a spring is apt to change in the course of time. Also, the reactive force of the mechanical device and the parts which it affects is apt to vary. Accordingly, errors may occur in the regulation, and therefore the regulating apparatus requires testing and readjusting from time to time.

It is possible to accomplish such readjustments when the magnet is excited with the correct voltage, the voltage which the regulating apparatus is adapted to maintain in the circuit. When the magnet is thus energized it is of course possible to determine whether the other forces within the regulating apparatus are in equilibrium.

In many cases, however, for example in connection with regulating apparatus employed in car lighting or train lighting systems, it is not convenient to make tests in the above manner because the generating equipment of the car cannot be set into operation whenever desired to provide the voltage for the coil of the electromagnet; also, generally speaking, an outside voltage is not available for exciting the electromagnet of the regulating apparatus. In addition, the majority of voltmeters which are generally available are not entirely dependable and accurate so that errors are apt to occur in the adjustment of the apparatus even though an outside source is employed for providing the voltage to excite the magnet.

It is an object of the present invention to provide means whereby the regulating apparatus may be tested and thereafter accurately adjusted conveniently and quickly without requiring the excitation of the electromagnet and without requiring the use of voltmeters or other measuring instruments. Other objects of the invention will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

The accompanying drawing illustrates diagrammatically one of the various possible embodiments of this invention.

Referring now to the drawing in detail, there is shown a regulating apparatus which will be assumed to be a voltage regulator, being adapted to maintain substantially constant the voltage of a source of current. The electromagnet of the regulating apparatus is shown at A, having an exciting coil B which is connected across the circuit, the voltage of which is to be regulated. The electromagnet is provided with a pivoted armature C, and the magnetic field tends to swing this armature about its pivot W in a counter-clockwise direction as viewed in the drawing. The armature C is connected by a pin D with the end of a carbon pile E and in the embodiment shown, the pin D forms a support for the carbon pile. The spring F acting through a lever G, acts upon the armature C in opposition to the force of the magnet and tends to compress the carbon pile E. A stop S conveniently limits the movement of the armature C in clockwise direction about the pivot W. The resistance of the carbon pile E, as is well known, decreases with increase of pressure thereon and increases as the pressure is relieved.

Assuming that the carbon pile E is positioned in the field circuit of a generator whose voltage is to be regulated, and the coil B is connected across the generator terminals, an increase in the generator voltage is adapted to reduce the pressure upon the carbon pile and thus reduce the field current of the generator by such an amount that the voltage falls and the correct voltage again prevails, the armature C being again brought into equilibrium in its new position. If the generator voltage falls, the pressure upon the carbon pile is increased, thereby increasing the field current of the generator to increase the generator voltage and the armature is again brought into equilibrium in its further new position.

As illustrative of the above-mentioned possible circuit arrangement of the carbon pile E and coil B, there is shown in the drawing a source of current such as a generator 10 supplying energy to a work circuit 11—12; the voltage across the work circuit 11—12 is to be regulated and accordingly coil B is connected across the work circuit by conductors 16—17 while conductors 14—15 connect the carbon pile E in circuit with the field 13 of the generator 10.

In the regulating apparatus which is illustrated in the drawing the forces between which equilibrium should prevail throughout the range of movement of the regulator, when the magnet is excited with the correct voltage, are the pull of the magnet, the pull of the spring and the reactive force exerted by the carbon pile. Adaptation of these three forces to each other may be effected by properly proportioning the lever G through which the spring F acts. The lever G swings, of course, about the pivot W and may be considered, in so far as the spring F is concerned, as substantially a bell crank lever pivoted at W and having a substantially horizontal arm through which the spring F acts and a substantially vertical arm (whose length is substantially equal to the distance between the axis or pivot W and the pin D) for direct action on the carbon pile E. The reactive force exerted by the carbon pile increases as the pressure thereon increases, but this is at least in part compensated for, if not entirely, by reason of the inter-relation of the parts whereby, for a given substantially fixed pull of the spring F, the force of compression of the carbon pile increases as the points W, D and N are brought more closely toward a straight line relation.

When the regulating apparatus is new and is first installed, it is correctly adjusted so that substantially the desired state of equilibrium exists. This is accomplished by impressing across the coil B a voltage equal to the voltage which the apparatus is adapted to maintain substantially constant in the source of current to be regulated thereby, and then adjusting the connection N and the spring adjustment P until the armature is in a suitable position with respect to the poles and in a state of substantial equilibrium, the pull of the spring substantially counter-balancing the pull of the magnet plus the reactive force of the carbon pile. Under these latter conditions, the armature C, with the coil B, energized at the desired or intended voltage, will substantially remain and be held in whatever position it is manually or otherwise placed within its scope or range of operative movement; the pull of the spring throughout this range of armature movement will substantially counterbalance the pull of the magnet plus the reactive force of the carbon pile. Such a counterbalance should, of course, exist for any position of the armature throughout its operative range of movement. As has been mentioned above, the reactive force of the carbon pile is apt to vary, for example, the normal pressure may diminish in the course of time by reason of shrinkage of the carbon pile; also, as has been mentioned above, the pull of the spring F, which is initially set at the correct value by means of the adjusting nuts P, may vary with time.

In the embodiment shown in the drawing, the rotatable armature C is provided with two projecting lugs J, each having an opening therethrough. A rod K is provided which is adapted to be passed through these openings and to be supported by the lugs, the rod having at one end a weight L and at a suitable point a marking indicated at M. When the apparatus is new and is properly adjusted, this weighted rod is inserted through the openings in the lugs J, as shown in the drawing, and the spring F is unhooked; then, with the magnet coil B not excited, the rod is moved along the lugs until it reaches a position in which it exactly holds the carbon pile in equilibrium; a marking indicated at O is then placed upon the armature at a point exactly opposite the marking M upon the rod. By way of clarification it might here be noted that, if the coil B is deenergized and the spring F is unhooked, the reactive force of the carbon pile E or its tendency to expand elastically from the position of maximum compression (the position shown in the drawing) causes the armature C to be swung somewhat in counter-clockwise direction and hence away from the stop S; the rod K with the weight L thereon is moved along, as above pointed out, until it reaches a position in which the carbon pile E has been compressed again to its initial state of compression and that point will be and is indicated when the armature C is just brought into contact again with the stop S. The torque exerted by the weight L which has been substituted for the spring F will thus exactly counterbalance the reactive force of the carbon pile E just as the spring F did before the latter was unhooked.

It will be seen that the rod, with its weight L, is, in effect, substituted for the spring F. Now, upon subsequent occasions after the regulating apparatus has been in use and when it is desired to test the pressure upon the carbon pile, it is necessary merely to unhook the spring F and, the magnet being without current, to insert the weighted rod K through the lugs J until the two markings M and O are in registry; with the rod K in this position equilibrium should exist. That is, the rod K with the weight L should be effective to just bring the armature C into contact with the stop S. If the equilibrium is found to have been lost, the pressure upon the carbon pile is readjusted by means of the bolt N until the desired equilibrium is achieved. Thus, by means of the weighted rod K, the normal pressure upon the carbon pile is very conveniently checked and, if necessary, readjusted to its original accuracy.

When the regulating apparatus is new and in proper adjustment, the rod K is inserted into the lugs J also from the left as viewed in the drawing; the position of the rod K in the lugs J is adjusted until the armature C is in exact equilibrium, with the magnet not excited and with the spring F operative; then another marking (not shown) is made upon the armature C opposite the marking M. When the rod K is thus inserted from the left, it will be seen that it acts upon the armature C in place of the pull of the coil B.

Now, upon subsequent occasions after the regulating apparatus has been in use and it is desired to test the apparatus and to adjust it if necessary, the rod K is first inserted from the right and the pressure of the carbon pile is checked and adjusted, as has been described above. Thereupon, the rod K is withdrawn, the spring F is hooked up and the rod is inserted into the lugs from the left until the markings are in proper registry. With the coil B not excited, the armature C should now be in exact equilibrium. Should this not be the case, the equilibrium is re-established by suitable adjustment of the spring adjusting nuts P.

It will be seen that this means of testing and checking the adjustments of the regulating apparatus is efficient and extremely simple. The rod K having been provided and the armature having been provided with the proper markings when the regulating apparatus was new and in correct adjustment, all that is thereafter required, in order to check the adjustments, is the use of the weighted rod which may be conveniently employed at any time and under any conditions. No source of current supply and no voltmeter are required for testing purposes.

It will be understood that, in place of the weighted rod K, the external forces employed may be furnished by other means such as springs, air pressure or the like, and, in place of the markings, the forces exerted may be indicated in various ways as by means of suitable apparatus for giving their size or amounts by numerical values.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

What I claim as new and desire to secure by Letters Patent is:

1. In a device of the class described, in combination, a regulating apparatus adapted to control a function of the output of a source of current and including a compressible carbon pile resistance, a movable armature adapted upon movement to vary the pressure upon said resistance, and a stop for limiting movement of said armature, said apparatus normally having a spring acting upon said armature to urge it toward said stop, and means for testing and aiding in adjusting said regulating apparatus comprising means substituted for said spring and adapted to act upon said armature in the place of said spring and with a predetermined force and means for adjusting said apparatus so that said stop just limits movement of said armature by said substituted means.

2. In a device of the class described, in combination, a regulating apparatus adapted to control a function of the output of a source of current and including a compressible carbon pile resistance, a movable armature adapted upon movement to vary the pressure upon said resistance, said apparatus normally having a coil which, when energized, tends to move said armature in one direction and having a spring normally acting in opposition to said armature, means for testing and aiding in adjusting said regulating apparatus comprising means adapted to be substituted for the force exerted by said coil upon said armature and adapted to act upon said armature in the place of said coil and with a predetermined force, and means for adjusting said apparatus so that, with said substituted means acting, equilibrium between the force of said spring, the reactive force of said carbon pile, and the force exerted by said substituted means, is established.

3. In a device of the class described, in combination, a regulating apparatus adapted to control a function of the output of a source of current and including a variable resistance, a movable armature adapted upon movement to vary said resistance, said apparatus normally having a coil which, when energized, tends to move said armature in one direction and having a spring normally acting in opposition to said armature, and means for testing and aiding in adjusting said regulating apparatus comprising means adapted to be substituted for said spring and adapted to act upon said armature in the place of said spring and with a predetermined force which is just sufficient to counterbalance the reactive force exerted by said resistance upon said armature when said coil is deenergized and the regulating apparatus is in a state of accurate adjustment.

4. In a device of the class described, in combination, a regulating apparatus adapted to control a function of the output of a source of current and including a variable resistance, a movable armature adapted upon movement to vary said resistance, said apparatus normally having a coil which, when energized, tends to move said armature in one direction and having a spring normally acting in opposition to said armature, and means for testing and aiding in adjusting said regulating apparatus comprising means adapted to be substituted for the force exerted by said coil upon said armature and adapted to act upon said armature in the place of said coil and with a predetermined force which is just sufficient to establish equilibrium of said armature together with the reactive force exerted by said resistance upon said armature and the force exerted by said spring upon said armature when said coil is deenergized and the regulating apparatus is in a state of accurate adjustment.

5. In a device of the class described, in combination, a regulating apparatus adapted to control a function of the output from a source of current and including a carbon pile, a movable armature adapted upon movement to vary the pressure upon said carbon pile to vary its resistance, said apparatus normally having a coil whose magnetic field tends to move said armature to release the pressure upon said carbon pile and having also normally a spring acting upon said armature in opposition to said coil, means for adjusting the normal pressure upon said carbon pile, means for adjusting the tension of said spring, and means for testing said regulating apparatus comprising means adapted to be substituted for said spring and adapted to exert upon said armature a predetermined force which is capable of establishing substantial equilibrium in said armature when said coil is deenergized and the normal pressure upon said carbon pile is in a state of accurate adjustment.

6. In a device of the class described, in combination, a regulating apparatus adapted to control a function of the output from a source of current and including a carbon pile, a movable armature adapted upon movement to vary the pressure upon said carbon pile to vary its resistance, said apparatus normally having a coil whose magnetic field tends to move said armature to release the pressure upon said carbon pile and having also normally a spring acting upon said armature in opposition to said coil, means for adjusting the normal pressure upon said carbon pile, means for adjusting the tension of said spring, and means for testing said regulating apparatus comprising means adapted to be placed in operation upon said armature in place of the force exerted thereon by said coil and adapted to exert upon said armature a predetermined force which is capable of establishing substantial equilibrium in said armature when said coil is deenergized and the normal pressure upon said carbon pile is in a state of accurate adjustment and said spring is accurately adjusted.

7. In a regulating apparatus adapted to control a function of the output from a source of current and including a variable resistance, a movable armature adapted upon movement to vary said resistance, said apparatus normally having a coil whose magnetic field tends to move said armature in one direction and having also normally a spring acting upon said armature tending to move it in the opposite direction, means for testing and aiding in adjusting said regulating apparatus comprising means adapted to act upon said armature with a force adapted to hold the armature in substantial equilibrium when the coil is deenergized and the regulating apparatus is in a state of proper adjustment.

8. In a regulating apparatus adapted to control a function of the output from a source of current to maintain said function at a substantially constant value and including a carbon pile, a movable armature connected to act upon one end of said carbon pile, an adjustable member against which the other end of said carbon pile bears, said apparatus normally having a coil whose magnetic field tends to move said armature to relieve the compression of said carbon pile, a spring tending to move said armature to increase the compression of said carbon pile, and means for adjusting said spring; means for testing and aiding in adjusting said regulating apparatus comprising a device normally inoperative and adapted when operative to maintain said armature in a state of substantial equilibrium when said coil is deenergized and providing said adjustable member and said spring are so adjusted that said armature is in a state of substantial equilibrium also when said device is inoperative and said coil is energized with the function to be regulated and at the value thereof to be maintained constant.

9. In a regulating apparatus adapted to control a function of the output from a source of current to maintain said function at a substantially constant value and including a pressure responsive variable resistance device, a movable armature connected to act upon said resistance, said apparatus normally having a coil whose magnetic field tends to move said armature in a direction to relieve the compression of said resistance device, a spring acting upon said armature and tending to compress said resistance device, and means for adjusting said spring; means for testing and aiding in adjusting said spring comprising a device normally inoperative and adapted when operative to maintain said armature in a state of substantial equilibrium when said coil is deenergized and providing said spring is adjusted so that said armature is in a state of substantial equilibrium also when said device is inoperative and said coil is energized with the output of said source of current to be regulated and with said function at the value thereof to be maintained constant.

In testimony whereof I have affixed my signature.

HUGO GROB.